United States Patent
Zhao et al.

(10) Patent No.: US 11,785,448 B2
(45) Date of Patent: Oct. 10, 2023

(54) METHOD AND DEVICE FOR IMPLEMENTING SECURE COMMUNICATION, AND STORAGE MEDIUM

(71) Applicant: BOE Technology Group Co., Ltd., Beijing (CN)

(72) Inventors: Kai Zhao, Beijing (CN); Hongtao Guan, Beijing (CN); Ying Zhang, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 324 days.

(21) Appl. No.: 17/256,232

(22) PCT Filed: Mar. 24, 2020

(86) PCT No.: PCT/CN2020/080939
§ 371 (c)(1),
(2) Date: Dec. 28, 2020

(87) PCT Pub. No.: WO2021/189258
PCT Pub. Date: Sep. 30, 2021

(65) Prior Publication Data
US 2022/0053323 A1  Feb. 17, 2022

(51) Int. Cl.
*H04L 29/06* (2006.01)
*H04W 12/03* (2021.01)
*H04L 9/06* (2006.01)

(52) U.S. Cl.
CPC .......... *H04W 12/03* (2021.01); *H04L 9/0637* (2013.01); *H04L 2209/80* (2013.01)

(58) Field of Classification Search
CPC ... H04W 12/03; H04L 9/0637; H04L 2209/80
See application file for complete search history.

(56) References Cited

U.S. PATENT DOCUMENTS 7,813,512 B2 * 10/2010 Futa ..................... H04L 9/0844
713/169
2005/0088279 A1 * 4/2005 Denison ............. G07C 9/00309
340/5.23
(Continued)

FOREIGN PATENT DOCUMENTS

| CN | 101194458 A | 6/2008 |
| CN | 106788982 A | 5/2017 |

(Continued)

*Primary Examiner* — Shawnchoy Rahman
(74) *Attorney, Agent, or Firm* — Ling Wu; Stephen Yang; Ling and Yang Intellectual Property

(57) ABSTRACT

This document discloses a method and device for implementing secure communication, and a storage medium. The method for implementing secure communication includes: encrypting first information and second information of a data packet respectively to generate an encrypted message; wherein, a region in which the encrypted first information is located is a first encrypted region, and a region in which the encrypted second information is located is a second encrypted region; the first information is used for a receiving device to determine whether to acquire the second information; and sending the encrypted message.

8 Claims, 4 Drawing Sheets

(56) References Cited

U.S. PATENT DOCUMENTS

| | | | | |
|---|---|---|---|---|
| 2007/0106896 A1* | 5/2007 | Sandberg | ............. | H04L 9/0643 |
| | | | | 713/170 |
| 2009/0154693 A1* | 6/2009 | Nakamura | ................ | H04L 9/06 |
| | | | | 380/30 |
| 2016/0218860 A1 | 7/2016 | Murray | | |

FOREIGN PATENT DOCUMENTS

| | | | | |
|---|---|---|---|---|
| CN | 108900511 A | 11/2018 | | |
| WO | WO-0062540 A1 * | 10/2000 | ............. | H04N 5/913 |

\* cited by examiner

METHOD AND DEVICE FOR IMPLEMENTING SECURE COMMUNICATION, AND STORAGE MEDIUM

CROSS-REFERENCE TO RELATED APPLICATION

The present application is a U.S. National Phase Entry of International Application No. PCT/CN2020/080939 having an international filing date of Mar. 24, 2020, the entire content of which is hereby incorporated by reference.

TECHNICAL FIELD

This document relates to, but is not limited to, the technical field of wireless communication, in particular to a method and device for implementing secure communication, and a storage medium.

BACKGROUND

The Internet of Things interconnects people, machines and things widely. Due to many distributed nodes, scattered data transmission, inadequate supervision and other reasons, the security and privacy problem of the Internet of Things becomes more prominent, and becomes a content which needs to be focused on by security management of the Internet of Things.

Secure communication refers to communication in which security measures are taken. In addition to using secret code, argot, password and other security measures, modern secure communication mainly uses channel security or information security. In channel security, a communication channel that makes it difficult for information thieves to intercept and receive information is used, for example, special lines, instant communication or radio spread spectrum communication is used. In information security, transmitted information is concealed by a method such as agreed code and password, and then transported. With development of an electronic technology, security machines have been used for security. It is characterized in that the transmitted information is transformed and encrypted at a sending end, and a receiving end restores the information according to a reverse process, so that even if an information thief receives a signal, the information thief can't understand a content represented by the signal.

Because the encryption decryption operations are added to the secure communication, power consumption of a device is fast.

SUMMARY

The following is a summary of the subject matter described in detail herein. This summary is not intended to limit the protection scope of the claims.

An embodiment of the present disclosure provides a method for implementing secure communication, a device and a storage medium.

In a first aspect, an embodiment of the present disclosure provides a method for implementing secure communication, including: encrypting first information and second information of a data packet respectively to generate an encrypted message; wherein, a region in which the encrypted first information is located is a first encrypted region, and a region in which the encrypted second information is located is a second encrypted region; the first information is used for a receiving device to determine whether to acquire the second information; and sending the encrypted message.

In a second aspect, an embodiment of the present disclosure provides a method for implementing secure communication, including: receiving an encrypted message; wherein the encrypted message is generated by encrypting first information and second information of an original data packet respectively, a region in which the encrypted first information is located is a first encrypted region, and a region in which the encrypted second information is located is a second encrypted region; and decrypting the first encrypted region of the encrypted message, and determining whether to acquire the second information according to the first information after the decryption is successful and the first information is acquired.

In a third aspect, an embodiment of the present disclosure provides a device for implementing secure communication, including: a communication module, a memory and a processor, wherein the communication module is connected with the processor, the memory stores a computer program, and when the computer program is executed by the processor, acts of the method for implementing secure communication provided in the above first aspect or acts of the method for implementing secure communication provided in the above second aspect are implemented.

In a fourth aspect, an embodiment of the present disclosure provides a computer-readable storage medium, storing a computer program, wherein when the computer program is executed by a processor, acts of the method for implementing secure communication provided in the above first aspect or acts of the method for implementing secure communication provided in the above second aspect are implemented.

Other aspects will become apparent upon reading and understanding accompanying drawings and the detailed description.

BRIEF DESCRIPTION OF DRAWINGS

Accompanying drawings are used for providing an understanding of technical solutions of the present disclosure and form a part of the specification. Together with embodiments of the present disclosure, they are used for explaining technical solutions of the present disclosure and do not constitute a limitation on the technical solutions of the present disclosure.

DETAILED DESCRIPTION

Figure 1:
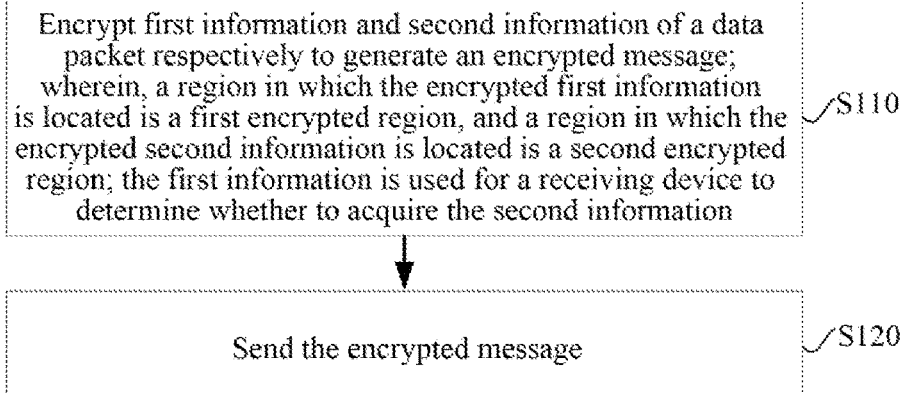
FIG. 1 is a flow chart of a method for implementing secure communication (for a sending device) according to an embodiment of the present disclosure.

The present application describes multiple embodiments, but the description is exemplary rather than limiting, and it is apparent to those of ordinary skill in the art that there may be more embodiments and implementation solutions within the scope of the embodiments described in the present application. Although many possible combinations of features are shown in the drawings and discussed in embodiments, many other combinations of the disclosed features are also possible. Unless specifically limited, any feature or element of any embodiment may be used in combination with, or may replace, any other feature or element of any other embodiment.

The present application includes and contemplates combinations of features and elements known to those of ordinary skilled in the art. The disclosed embodiments, features and elements of the present application may also be combined with any regular features or elements to form a unique inventive solution as defined by the claims. Any features or elements of any embodiments may also be combined with features or elements from other inventions to form another unique invention defined by the claims. Therefore, it should be understood that any of the features shown and/or discussed in the present application may be implemented individually or in any suitable combination. Therefore, embodiments are not limited except by the limitations according to the appended claims and their equivalents. In addition, various modifications and changes may be made within the protection scope of the appended claims.

In addition, when describing representative embodiments, the specification may have presented methods and/or processes as a specific sequence of acts. However, to the extent that the method or process does not depend on the specific order of acts described herein, the method or process should not be limited to the specific order of acts described. As one of ordinary skill in the art will understand, other sequences of acts are also possible. Therefore, the specific order of acts set forth in the specification should not be interpreted as limiting the claims. In addition, the claims for the method and/or the process should not be limited to performing their acts in the written order, and those of skilled in the art may easily understand that these orders may change and still keep within the spirit and the scope of the embodiments of the present application.

FIG. 1 is a flow chart of a method for implementing secure communication according to an embodiment of the present disclosure. As shown in FIG. 1, the method for implementing secure communication may include act S110 and act S120.

In act S110, first information and second information of a data packet are respectively encrypted to generate an encrypted message; wherein, a region in which the encrypted first information is located is a first encrypted region, and a region in which the encrypted second information is located is a second encrypted region; the first information is used for a receiving device to determine whether to acquire the second information.

In act S120, the encrypted message is sent.

In this embodiment, a sending device encrypts a data packet in different regions to construct an encrypted message, and a receiving device may determine whether to perform complete decryption by partially decrypting the encrypted message when decrypting. When the complete decryption is needed, security of secure communication is enhanced by decrypting twice, and when the complete decryption is not needed, power dissipation can be saved by reducing decryption operations.

In an exemplary embodiment, the first information may include any combination of any one or more pieces of following information: a receiving device identification, a sending device identification, and a message control word.

In an exemplary embodiment, the message control word may include any combination of any one or more of the following: a registration request, a registration response, a location query, a location report, or an alarm, etc.

In an exemplary embodiment, the second information includes data information corresponding to the message control word. For example, if the message control word is location report, the second information may include location information of the sending device. If the message control word is an alarm, the second information may include a specific content of the alarm.

In an exemplary embodiment, the first information and the second information of the data packet are respectively encrypted to generate the encrypted message, including: the first information of the data packet is encrypted by hardware encryption.

In an exemplary embodiment, the first information and the second information of the data packet are respectively encrypted to generate the encrypted information message, including: the second information of the data packet is encrypted by software encryption.

In an exemplary embodiment, the encryption modes used for the first information and the second information may be different. For example, the first information is encrypted by hardware and the second information is encrypted by software; the first information and the second information are both encrypted by hardware, but different keys are used; the first information and the second information are both encrypted by software, but different encryption algorithms are used; and the first information and the second information are both encrypted by software, using a same encryption algorithm and different keys.

Compared with software encryption, hardware encryption has a characteristic of fast speed, and a DMA (Direct Memory Access) transmission mode may be used for hardware encryption to reduce usage of CPU computing resources, so that CPU may handle other transactions during hardware encryption. Compared with hardware encryption, software encryption has an advantage of flexible encryption algorithm design, and more complex encryption algorithms may be designed, increasing security of encrypted messages.

A terminal may use a singlechip with an Advanced Encryption Standard (AES) hardware accelerator. The singlechip with the AES hardware accelerator, such as STM32 series, may use a singlechip of STM32L series in consideration of low power dissipation. When a singlechip of STM32L series is used, only dozens of machine cycles may be needed to complete fast AES encryption, with fast encryption speed.

In an exemplary embodiment, the first information may also include: length information of the second encrypted region, or location information of a start byte of the second encrypted region of the encrypted message in the encrypted message and length information of the second encrypted region. The length information of the second encrypted region is carried in the first information, which may enable the sending device to flexibly control a length of the second information, and long second information and short second information may both be sent.

An original data packet may include first information and second information, or may also include first information, second information and other information. Other information is optional, for example, the other information may be a check word of the original data packet. Table 1 is an example of an original data packet. As shown in Table 1, the original data packet includes first information, second information and other information, wherein the first information includes a receiving device identification, a sending device identification, a message control word, and length information of a second encrypted region. The second information includes data information corresponding to the message control word. Other information includes a check word, wherein the check word may be a check for all bytes of the original data packet or a check for partial bytes of the original data packet. The first information and the second information of the original data packet are respectively encrypted by the above encryption mode to generate an encrypted message, wherein the encrypted message may include a first encrypted region, a second encrypted region and an unencrypted region. A region in which the encrypted first information is located is a first encrypted region, a region in which the encrypted second information is located is a second encrypted region, the check word may not be encrypted, and a region in which the check word is located is an unencrypted region.

In an exemplary embodiment, the first information may include any combination of any one or more pieces of following information: a receiving device identification, a sending device identification, and a message control word.

In an exemplary embodiment, the message control word may include any combination of any one or more of the following: a registration request, a registration response, a location query, a location report, or an alarm, etc.

In an exemplary embodiment, the second information includes data information corresponding to the message control word. For example, if the message control word is location report, the second information may include location information of the sending device. If the message control word is an alarm, the second information may include a specific content of the alarm.

In an exemplary embodiment, receiving the encrypted message may include receiving the whole of the encrypted message; or, receiving the first encrypted region of the encrypted message.

In an exemplary embodiment, before the receiving device receives the first encrypted region of the encrypted message,

TABLE 1

| Encrypted information message | First encrypted region | | | | Second encrypted region | Unencrypted region |
|---|---|---|---|---|---|---|
| Original data packet | First information | | | | Second information | Other information |
| | Receiving device identification | Sending device identification | Message control word | Length of the second encrypted region | Data corresponding to the message control word | Check word |

In other embodiments of some original data packets, the first information may not include the length of the second encrypted region, and the second encrypted region uses a fixed length, or the sending device and the receiving device agree on the length of the second encrypted region.

In an exemplary embodiment, sending the encrypted message includes that the encrypted message is sent through a broadcast communication mode, or the encrypted message is sent to the receiving device through a point-to-point communication mode.

Figure 2:
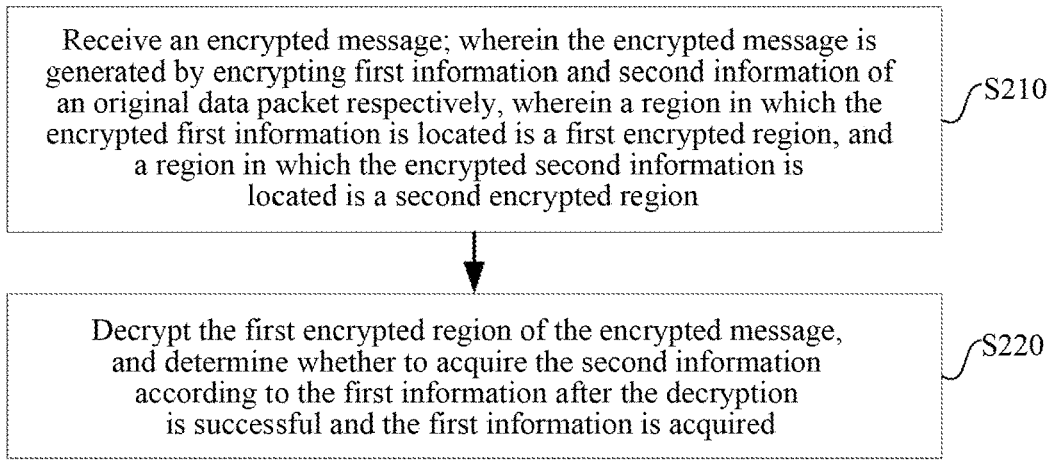
FIG. 2 is a flowchart of a method for implementing secure communication (for a receiving device) according to an embodiment of the present disclosure.

FIG. 2 is a flow chart of a method for implementing secure communication provided by an embodiment of the present disclosure. As shown in FIG. 2, the method for implementing secure communication may include act S210 and act S220.

In act S210, an encrypted message is received; wherein the encrypted message is generated by encrypting first information and second information of an original data packet respectively, a region in which the encrypted first information is located is a first encrypted region, and a region in which the encrypted second information is located is a second encrypted region.

In act S220, the first encrypted region of the encrypted message is decrypted, and whether to acquire the second information is determined according to the first information after the decryption is successful and the first information is acquired.

In this embodiment, when the receiving device receives the encrypted message, whether to perform complete decryption may be determined by partially decrypting the encrypted message. When the complete decryption is needed, security of secure communication is enhanced by decrypting twice, and when the complete decryption is not needed, power dissipation can be saved by reducing decryption operations.

the method further includes: determining the length information of the first encrypted region of the encrypted message; wherein, a length of the first encrypted region of the encrypted message is a fixed length or a length agreed by the sending device and the receiving device.

In an exemplary embodiment, receiving the encrypted message includes receiving the whole of the encrypted message, and determining whether to acquire the second information according to the first information includes: when it is determined according to the first information that the encrypted message is a legal message, a second encrypted region of the received encrypted message is decrypted to acquire the second information; and when it is determined according to the first information that the encrypted message is not a legal message, the second encrypted region of the encrypted message is not decrypted.

In an exemplary embodiment, the first encrypted region of the encrypted message is decrypted, including: hardware decryption is performed on the first encrypted region of the encrypted message.

Compared with software decryption, hardware decryption has a characteristic of fast speed, and a DMA (Direct Memory Access) transmission mode may be used for hardware encryption to reduce usage of CPU computing resources, so that CPU may handle other transactions during hardware decryption. Compared with hardware decryption, software decryption has an advantage of flexible decryption algorithm design, more complex decryption algorithms may be designed, increasing difficulty of decryption.

A terminal may use a singlechip with an Advanced Encryption Standard (AES) hardware accelerator. The singlechip with the AES hardware accelerator, such as STM32 series, may use a singlechip of STM32L series in consideration of low power dissipation. When a singlechip of STM32L series is used, only dozens of machine cycles may be needed to complete fast AES decryption, with fast decryption speed.

In an exemplary embodiment, hardware decryption is performed on the first encrypted region of the encrypted message, including: hardware decryption is performed on the first encrypted region of the encrypted message by using a singlechip with an Advanced Encryption Standard (AES) hardware accelerator.

In an exemplary embodiment, while the first encrypted region of the encrypted message is decrypted, the method further includes: continuing receiving a remaining part of the encrypted message except the first encrypted region. Herein, if hardware decryption is performed on the first encrypted region of the encrypted message, the CPU may continue receiving the remaining part of the encrypted message during hardware decryption. If software decryption is performed on the first encrypted region of the encrypted message, the CPU may use, in a multithread mode, one thread for receiving data and another thread for decrypting data.

In an exemplary embodiment, receiving the encrypted message includes receiving the first encrypted region of the encrypted message, and determining whether to acquire the second information according to the first information includes: when it is determined that the encrypted message is a legal message according to the first information, it is determined whether the second encrypted region of the encrypted message has been received completely, and if so, the second encrypted region of the encrypted message is decrypted to acquire the second information, if not, the second encrypted region of the encrypted message is continued to be received until the second encrypted region of the encrypted message is received completely, and the second encrypted region of the encrypted message is decrypted to acquire the second information; when it is determined that the encrypted message is not a legal message according to the first information, it is determined whether the second encrypted region of the encrypted message has been received completely, and if so, the second encrypted region of the encrypted message is not decrypted, if not, the encrypted message is not continued to be received.

In an exemplary embodiment, receiving the encrypted message includes receiving the first encrypted region of the encrypted message, and determining whether to acquire the second information according to the first information includes: when it is determined according to the first information that the encrypted message is a legal message, the remaining part of the encrypted message except the first encrypted region is received, and the second encrypted region of the encrypted message is decrypted to acquire the second information; when it is determined according to the first information that the encrypted message is not a legal message, the remaining part of the encrypted message except the first encrypted region is not received.

In an exemplary embodiment, if the encrypted message includes an unencrypted check word, after the second information is acquired, the method further includes: extracting the check word from the encrypted message, and verifying the acquired second information according to the check word.

In an exemplary embodiment, decrypting the second encrypted region of the encrypted message includes: decrypting the second encrypted region of the encrypted message by software decryption.

In an exemplary embodiment, before the second encrypted region of the encrypted message is decrypted, the method further includes: determining a length information of the second encrypted region of the encrypted message; wherein, the length of the second encrypted region of the encrypted message is a fixed length, or a length agreed by the sending device and the receiving device, or the first information includes the length information of the second encrypted region.

In an exemplary embodiment, the legal message may include any combination of any one or more of the following: a message in which a receiving device identification matches a present device identification in the first information, a message in which a sending device identification matches an identification of any secure communication peer of a present device in the first information, and an alarm message. An example of the secure communication peer is that a terminal bound to the gateway during registration is the secure communication peer of the gateway, and the gateway to which the terminal is bound during registration is the secure communication peer of the terminal. Among them, because of its high degree of urgency, an emergency alarm message may not be limited by the matching between the sending device identification and the receiving device identification.

Figure 3:
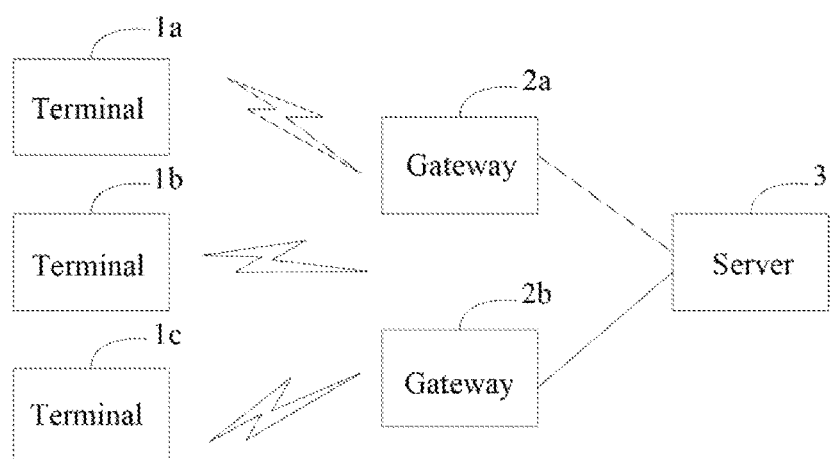
FIG. 3 is a schematic diagram of a system for implementing secure communication according to an embodiment of the present disclosure.

FIG. 3 is an example diagram of a system for implementing secure communication according to an embodiment of the present disclosure.

As shown in FIG. 3, a system for implementing secure communication may include at least one terminal (e.g., terminals 1a, 1b and 1c), at least one gateway (e.g., gateways 2a and 2b), and a server (e.g., server 3).

The terminal may communicate with the gateway using a wireless communication technology or another communication technology. The gateway may communicate with the server using a wireless communication technology or another communication technology. The server is used for sending instructions to the terminal through the gateway, and analyzing data uploaded by the terminal forwarded by the gateway. The wireless communication technology may include bluetooth, ZigBee, Near Field Communication technology (NFC), or Wifi, etc. The gateway may send a data packet to the terminal in a broadcast mode or a point-to-point mode, and the terminal may also send a data packet to the gateway in a broadcast mode or a point-to-point mode.

The system for implementing secure communication may be a logistics system, and a locating tracker is used as a terminal, the tracker may be disposed on a package or carried by logistics personnel. When the terminal joins a wireless network, it binds to a corresponding gateway, and the gateway maintains a device list, wherein an identification of each terminal bound to the gateway is recorded in the device list. After the location of the terminal is moved, the bound gateway may be changed according to a strength of a wireless signal. In a large-scale logistics warehouse, there are a large quantity of terminals and multiple gateways are also arranged in different regions. By using the above secure communication method between a terminal and a gateway, the gateway performs a complete decryption operation only when it is determined that decryption needs to be continued after partially decrypting (decrypting the first encrypted region), thus power dissipation of the gateway can be saved, improving efficiency of the gateway for forwarding data. The system for implementing secure communication may also be a locating tracking system for shared bicycles or an access control system in an intelligent building.

Figure 4:
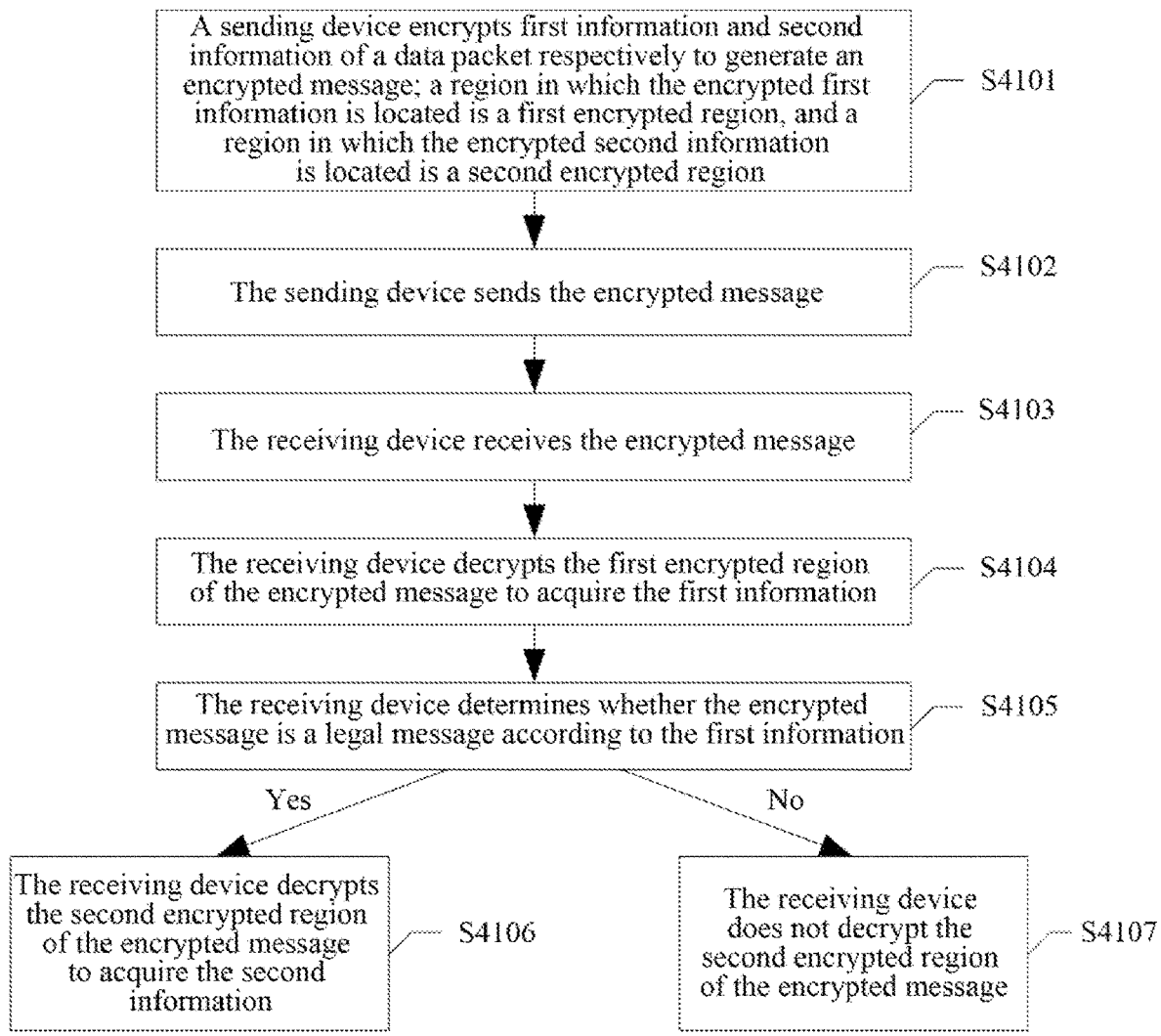
FIG. 4 is a flow chart of secure communication between a sending device and a receiving device according to an embodiment of the present disclosure.

As shown in FIG. 4, the secure communication between a sending device and a receiving device may include following acts S4101-S4107.

In act S4101, the sending device encrypts first information and second information of a data packet respectively to generate an encrypted message; a region in which the encrypted first information is located is a first encrypted region, and a region in which the encrypted second information is located is a second encrypted region; the first information is used for the receiving device to determine whether to acquire the second information; wherein, the first information includes a receiving device identification, a sending device identification, and a message control word.

In act S4102, the sending device sends the encrypted message.

In act S4103, the receiving device receives the encrypted message.

In act S4104, the receiving device decrypts the first encrypted region of the encrypted message to acquire the first information.

In act S4105, the receiving device determines whether the encrypted message is a legal message according to the first information, and if so, act S4106 is performed, otherwise, act S4107 is performed. Herein, the legal message may include any combination of any one or more of the following: a message in which a receiving device identification matches a present device identification in the first information, a message in which a sending device identification matches an identification of any secure communication peer of a present device in the first information, and an alarm message.

In act S4106, the receiving device decrypts the second encrypted region of the encrypted message to acquire the second information, and the flow ends.

In act S4107, the receiving device does not decrypt the second encrypted region of the encrypted message, and the flow ends.

In this embodiment, the sending device encrypts the data packet in different regions, and the receiving device may determine whether the data packet needs to be completely decrypted by partially decrypting the encrypted data packet. When complete decryption is needed, security of secure communication is enhanced by decrypting twice, and when complete decryption is not needed, the second act of decryption operation is omitted, which can save power dissipation.

Figure 5:
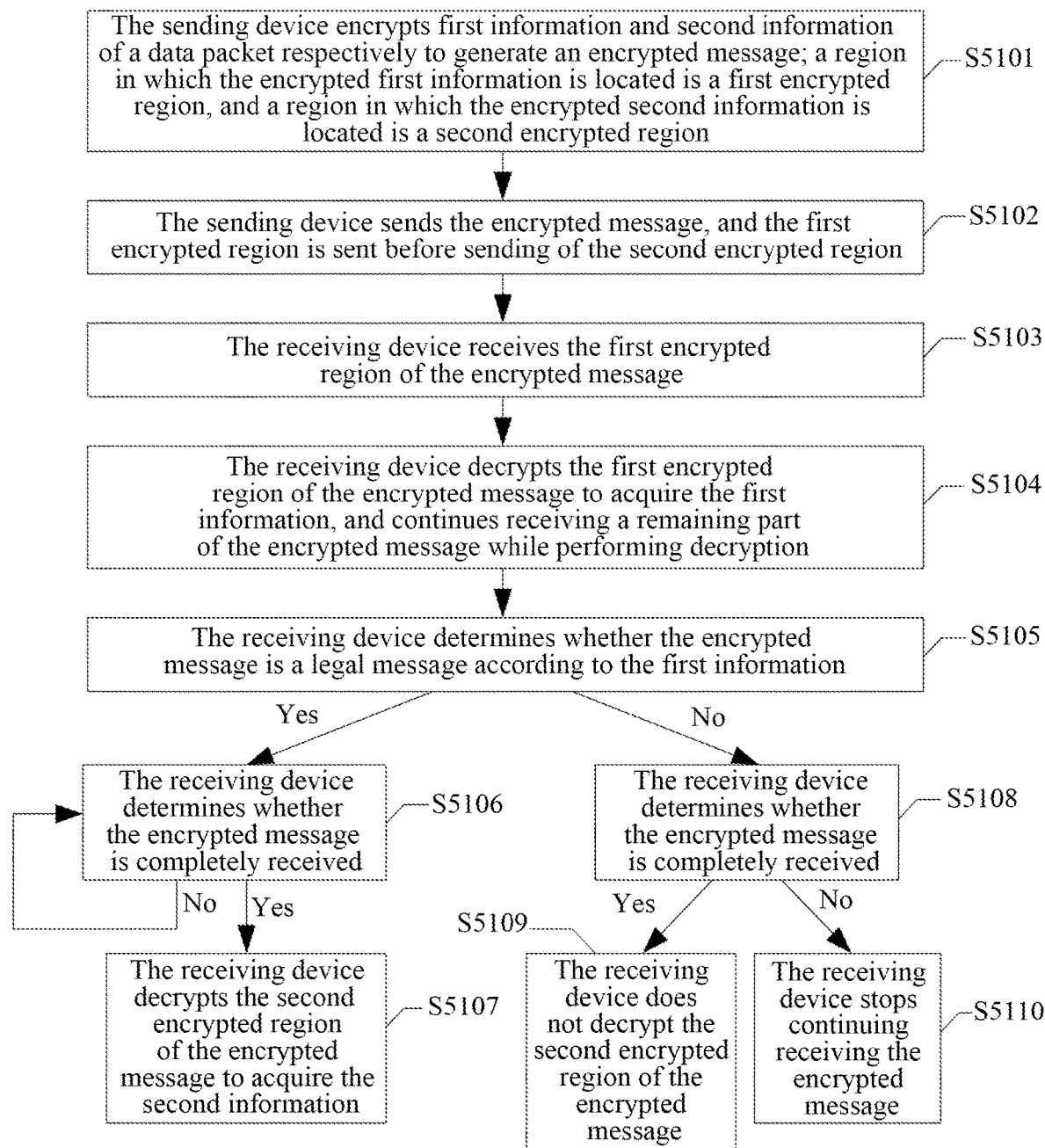
FIG. 5 is another flow chart of secure communication between a sending device and a receiving device according to an embodiment of the present disclosure.

As shown in FIG. 5, when the sending device sends an encrypted message, the first encrypted region is sent before the second encrypted region, and when receiving the encrypted message, the receiving device receives the first encrypted region of the encrypted message first. The secure communication performed between the sending device and the receiving device may include following acts S5101-S5110.

In act S5101, the sending device encrypts first information and second information of a data packet respectively to generate an encrypted message; a region in which the encrypted first information is located is a first encrypted region, and a region in which the encrypted second information is located is a second encrypted region; the first information is used for the receiving device to determine whether to acquire the second information. Herein, the first information includes a receiving device identification, a sending device identification, and a message control word.

In act S5102, the sending device sends the encrypted message, and the first encrypted region is sent before the second encrypted region.

In act S5103, the receiving device receives the first encrypted region of the encrypted message.

In act S5104, the receiving device decrypts the first encrypted region of the encrypted message to acquire the first information, and continues receiving a remaining part of the encrypted message while decrypting. If hardware decryption is performed on the first encrypted region of the encrypted message, CPU may continue receiving the remaining part of the encrypted message during hardware decryption. If software decryption is performed on the first encrypted region of the encrypted message, the CPU may use, in a multithread mode, one thread for receiving data and another thread for decrypting data.

In act S5105, the receiving device determines whether the encrypted message is a legal message according to the first information, and if so, act S5106 is performed, otherwise, act S5108 is performed. Herein, the legal message may include any combination of any one or more of the following: a message in which a receiving device identification matches a present device identification in the first information, a message in which a sending device identification matches an identification of any secure communication peer of a present device in the first information, and an alarm message.

In act S5106, the receiving device determines whether the encrypted message is completely received, and if so, act S5107 is performed, otherwise, the flow returns to act S5106.

In act S5107, the receiving device decrypts the second encrypted region of the encrypted message to acquire the second information, and the flow ends.

In act S5108, the receiving device determines whether the encrypted message is completely received, and if so, act S5109 is performed, otherwise, act S5110 is performed.

In act S5109, the receiving device does not decrypt the second encrypted region of the encrypted message, and the flow ends.

In act S5110, the receiving device stops continuing receiving the encrypted message, and the flow ends.

In this embodiment, the sending device encrypts the data packet in different regions, and the first encrypted region is sent before the second encrypted region when the encrypted message is sent. When receiving the encrypted message, the receiving device first receives the first encrypted region of the encrypted message, and acquires the first information through hardware decryption. When it is determined that complete decryption is needed according to the first information, security of secure communication is enhanced by continuing receiving the remaining part of the encrypted message and decrypting twice. When it is determined that complete decryption is not needed according to the first information, power dissipation is saved by no longer continuing receiving the remaining part of the encrypted message and/or no longer encrypting the second encrypted region.

An embodiment of the present disclosure provides a device for implementing secure communication, including: a communication module, a memory and a processor, wherein the communication module is connected with the processor, the memory stores a computer program, and when the computer program is executed by the processor, acts of the above method for implementing secure communication are performed. In an exemplary embodiment, the device for implementing secure communication is a terminal or a gateway.

Figure 6:
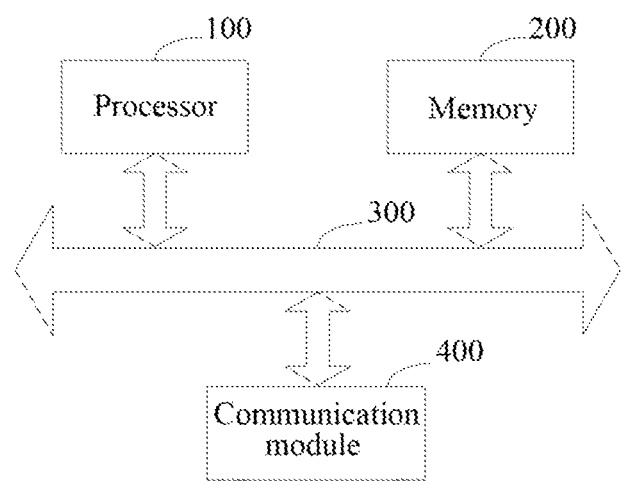
FIG. 6 is a schematic diagram of a device for implementing secure communication according to an embodiment of the present disclosure.

FIG. 6 is an example diagram of a device for implementing secure communication according to an embodiment of the present disclosure. As shown in FIG. 6, a device for implementing secure communication according to this exemplary embodiment includes a processor 100, a memory 200, a bus system 300 and a communication module 400;

wherein the processor 100, the memory 200 and the communication module 400 are connected through the bus system 300, and the memory 200 stores a computer program, when the computer program executed by the processor, acts of the above method for implementing secure communication are performed.

Herein, the communication module may communicate with a peer device using a wireless communication technology or another communication technology. In this embodiment, the wireless communication technology may include bluetooth, ZigBee, Near Field Communication technology (NFC), or Wifi, etc. The communication module may communicate with the peer device in a broadcast mode or a point-to-point mode.

It should be understood that the processor may be a Central Processing Unit (CPU), another general-purpose processor, a Digital Signal Processor (DSP), an Application Specific Integrated Circuit (ASIC), a Field Programmable Gate Array (FPGA) or another programmable logic device, a discrete gate or a transistor logic device, a discrete hardware component, etc. The general purpose processor may be a microprocessor, or the processor may also be any conventional processor, or the like.

The memory may include a read-only memory and a random access memory, and provide instructions and data to the processor. A part of the memory may also include a non-volatile random access memory. For example, the memory may also store information of device type.

Besides a data bus, a bus system may also include a power bus, a control bus and a status signal bus, etc. In FIG. 6, all kinds of buses are labeled as the bus system.

In an implementation process, processing performed by the device for implementing secure communication may be completed through an integrated logic circuit of hardware in the processor or instructions in a form of software. That is, the acts of the method in the embodiment of the present disclosure may be embodied as completion of execution of the hardware processor, or completion of combination execution of hardware and software modules in the processor. The software module may be located in a storage medium such as a random memory, a flash memory, a read-only memory, a programmable read-only memory or an electrically erasable programmable memory, a register. The storage medium is located in the memory, and the processor reads information in the memory and completes the acts of the foregoing methods in combination with hardware thereof. To avoid repetition, the specific content of the method will not be described in detail here again.

An embodiment of the present disclosure provides a computer-readable storage medium, storing a computer program, wherein when the computer program is executed by a processor, acts of the above method for implementing secure communication are performed.

Those of ordinary skill in the art will understand that all or some of the acts, systems, and functional modules/units in the apparatuses disclosed above may be implemented as software, firmware, hardware, and appropriate combinations thereof. In hardware implementations, the division between functional modules/units mentioned in the above description does not necessarily correspond to the division of physical components. For example, a physical component may have multiple functions, or a function or step may be performed by several physical components in cooperation. Some or all of the components may be implemented as software executed by a processor, such as a digital signal processor or a microprocessor, or be implemented as hardware, or be implemented as an integrated circuit, such as an application specific integrated circuit. Such software may be distributed on computer readable media, which may include computer storage media (or non-transitory media) and communication media (or transitory media). As is well known to those of ordinary skill in the art, the term computer storage media includes volatile and nonvolatile, removable and non-removable media implemented in any method or technology for storing information such as computer readable instructions, data structures, program modules or other data. Computer storage media include, but are not limited to, RAM, ROM, EEPROM, flash memory or other memory technologies, CD-ROM, Digital Versatile Disk (DVD) or other optical disk storage, magnetic cassettes, magnetic tapes, magnetic disk storage or other magnetic storage devices, or any other media that may be used to store desired information and may be accessed by a computer. Furthermore, it is well known to those of ordinary skill in the art that communication media typically contain computer readable instructions, data structures, program modules, or other data in a modulated data signal such as a carrier wave or other transmission mechanism, and may include any information delivery medium.

What we claim is:

1. A method for implementing secure communication, comprising:

receiving an encrypted message; wherein the encrypted message is generated by encrypting first information and second information of an original data packet respectively, a region in which the encrypted first information is located is a first encrypted region, and a region in which the encrypted second information is located is a second encrypted region; and decrypting the first encrypted region of the encrypted message, and determining whether to acquire the second information according to the first information after the decryption is successful and the first information is acquired, wherein:

receiving the encrypted message comprises receiving whole of the encrypted message; or, receiving the first encrypted region of the encrypted message;

receiving the encrypted message comprises receiving the first encrypted region of the encrypted message, and while decrypting the first encrypted region of the encrypted message, the method further comprises continuing receiving a remaining art of the encrypted message; and determining whether to acquire the second information according to the first information comprises:

when it is determined that the encrypted message is a legal message according to the first information, determining whether the second encrypted region of the encrypted message has been received completely, if the second encrypted region of the encrypted message has been received completely, decrypting the second encrypted region of the encrypted message to acquire the second information; if the second encrypted region of the encrypted message has not been received completely, continuing receiving the second encrypted region of the encrypted message until the second encrypted region of the encrypted message is received completely, and decrypting the second encrypted region of the encrypted message to acquire the second information; and when it is determined that the encrypted message is not a legal message according to the first information, determining whether the second encrypted region of the encrypted message has been received completely, if the second encrypted region of the encrypted message has been received completely, not decrypting the second encrypted region of the encrypted message; if the second encrypted region of the encrypted message has not been received completely, not continuing receiving the encrypted message.

2. The method according to claim 1, wherein:
the first information comprises any combination of any one or more pieces of following information: a receiving device identification, a sending device identification, and a message control word;
the second information comprises data information corresponding to the message control word.

3. The method according to claim 1, wherein: receiving the encrypted message comprises receiving whole of the encrypted message; and determining whether to acquire the second information according to the first information comprises:
  when it is determined according to the first information that the encrypted message is a legal message, decrypting the second encrypted region of the received encrypted message to acquire the second information; and when it is determined according to the first information that the encrypted message is not a legal message, not decrypting the second encrypted region of the encrypted message.

4. The method according to claim 1, wherein: receiving the encrypted message comprises receiving the first encrypted region of the encrypted message; and determining whether to acquire the second information according to the first information comprises:
  when it is determined according to the first information that the encrypted message is a legal message, receiving a remaining part of the encrypted message except the first encrypted region, and decrypting the second encrypted region to acquire the second information; and when it is determined according to the first information that the encrypted message is not a legal message, not receiving the remaining part of the encrypted message except the first encrypted region.

5. The method according to claim 1, wherein:
decrypting the first encrypted region of the encrypted message comprises: performing hardware decryption on the first encrypted region of the encrypted message.

6. The method according to claim 5, wherein:
performing hardware decryption on the first encrypted region of the encrypted message comprises: performing hardware decryption on the first encrypted region of the encrypted message by using a singlechip with an Advanced Encryption Standard (AES) hardware accelerator.

7. A device for implementing secure communication, comprising: a communication module, a memory and a processor, wherein the communication module is connected with the processor, the memory stores a computer program, and when the computer program is executed by the processor, acts of the above method for implementing secure communication according to claim 1 are implemented.

8. A non-transitory computer-readable storage medium, storing a computer program, wherein when the computer program is executed by a processor, acts of the above method for implementing secure communication according to claim 5 are implemented.

* * * * *

UNITED STATES PATENT AND TRADEMARK OFFICE
CERTIFICATE OF CORRECTION

| | | |
|---|---|---|
| PATENT NO. | : 11,785,448 B2 | Page 1 of 1 |
| APPLICATION NO. | : 17/256232 | |
| DATED | : October 10, 2023 | |
| INVENTOR(S) | : Kai Zhao, Hongtao Guan and Ying Zhang | |

It is certified that error appears in the above-identified patent and that said Letters Patent is hereby corrected as shown below:

In the Claims

Column 14 Line 28-32 Claim 8 should read as follows:
8. A non-transitory computer-readable storage medium, storing a computer program, wherein when the computer program is executed by a processor, acts of the above method for implementing secure communication according to claim 1 are implemented.

Signed and Sealed this
Thirtieth Day of July, 2024

Katherine Kelly Vidal
*Director of the United States Patent and Trademark Office*